| NUCLEI OR BASE GRANULE | ENLARGED GRANULE WITH COATING ON NUCLEI GRANULE AFTER MASSECUITE ADDITION | ENLARGED GRANULE AFTER POST-CRYSTALLIZATION & DRYING |

KEY: ☐ ORIGINAL MICROCRYSTALS
▨ MICROCRYSTALS ADDED IN MASSECUITE
■ MICROCRYSTALS FORMED IN POST-CRYSTALLIZATION

INVENTOR:
WILLIAM C. BLACK
Dawson, Tilton, Falloy
Sungmus
ATT'YS

United States Patent Office 3,582,399
Patented June 1, 1971

3,582,399
PROCESS FOR PREPARING GRANULAR
CRYSTALLINE SUGAR PRODUCTS
William C. Black, Cedar Rapids, Iowa, assignor to Penick
& Ford Limited, Cedar Rapids, Iowa
Filed July 15, 1968, Ser. No. 744,958
Int. Cl. C13f 3/00; C13k 1/10
U.S. Cl. 127—58
15 Claims

ABSTRACT OF THE DISCLOSURE

Granular crystalline sugar products are prepared by granule enlargement of a preformed or recycled starting material comprising Massecuite Aggregated Microcrystalline Sugar granules. The granules of the starting material are composed essentially of cohered sugar microcrystals with internal capillary networks capable of absorbing water. In a preferred embodiment, a sugar massecuite is applied to the granular starting material, the massecuite comprising microcrystalline sugar suspended in a saturated aqueous solution of crystallizable sugar. The massecuite is distributed on and coats the exteriors of the individual granules. By removal of free water from the coated massecuite layers, the deposited microcrystals are integrated and additional sugar microcrystals are deposited from the solution phase of the coated massecuite to form enlarged granules of similar structure and properties to the starting material. The process is particularly applicable to the preparation of free-flowing granular crystalline sugar products containing a minor proportion of non-crystallizable sugar which would normally impart a sticky characteristic to the product, such as the preparation of crystalline dextrose granules from a Total Sugar starch hydrolyzate.

BACKGROUND

Figure 1:
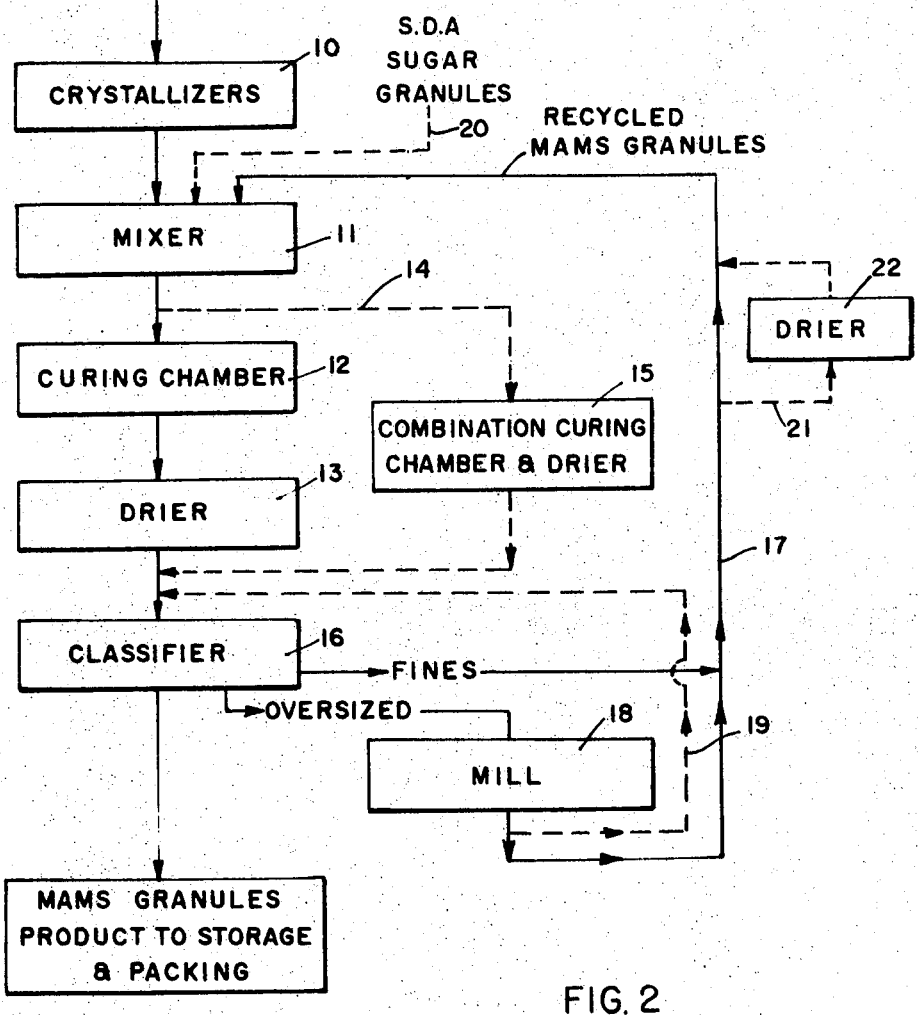

In recent years, a new process has been developed for preparing free-flowing sugar granules from crystallizable sugars. The process is applicable to the manufacture of granular dextrose products from starch hydrolyzates of high D.E., which are referred to as "Total Sugar" products, since they are composed of dextrose in admixture with the residual oligosaccharides of the saccharification. However, the process is also applicable to sucrose, and, in fact, to any other crystallizable sugar. The details of the process are set out in co-pending application Ser. No. 674,168, filed Oct. 10, 1967, entitled "Novel Granular Sugar Products and Process for Producing."

The process of the cited application has sometimes been referred to as "Spray Crystallization." However, the product produced by the process can be more accurately described as "Spray-Drier Aggregated" granules (hereinafter "SDA" granules). The crystallization takes place primarily before and after the spray drying step. In addition to removing a substantial portion of water, one of the functions of the spray drying is to form the basic aggregate structure, the granular aggregates thus obtained being subsequently aged and dried to complete the granulation process.

More specifically, in the process of the cited application, a water solution of a crystallizable sugar is subjected to partial crystallization to form a pumpable massecuite composed essentially of microcrystals of sugar dispersed in a saturated water solution of sugar. This massecuite, which may contain from 40 to 60% of the sugar in crystalline form, is sprayed into a drying air stream to form atomized droplets and to remove a major portion of the water from the droplets in the air stream to form granular aggregates of the microcrystals containing residual crystallizable sugar solution. Essentially each droplet forms a single aggregate of generally spherical shape. This step is preferably carried out in a spray drier tower where the massecuite droplets are formed at the top and fall downwardly through the tower with the evaporation of water therefrom. Where the hydrate crystal form is critical, as with the conversion of dextrose to alpha dextrose monohydrate crystals, the spray drier is operated at a sufficiently low temperature to avoid formation of anhydrous dextrose or other unstable crystal form. For example, the massecuite droplets during spray drying of a starch hydrolyzate can be kept below 50° C. With sucrose and other sugars, the spray drying temperature can be varied over a wider range, especially where the sugar has only one crystalline form, such as with sucrose which forms only anhydrous crystals.

The granular crystalline material produced by the spray aggregation process just described, will contain additional crystallizable sugar, which may be in the form of a supersaturated solution that will rapidly crystallize. However, the granules obtained from the spray drier have sufficient structural integrity to permit them to be transferred to other processing apparatus for completion of the crystallization. This further processing can include an aging procedure in which crystallization is continued with or without removal of additional water. As a final step, it is desirable to subject the granular aggregates to drying to force completion of the crystallization, and at the same time to reduce the free water content to a very low level. Where part of the water combines with the sugar as it crystallizes, free water is eliminated in this way as well as by evaporation. The free water content of the final granular products will usually be below 1% by weight, and may be as low as 0.5% or lower. Where the granular product is formed principally of dextrose monohydrate, overdrying can convert some or all of the monohydrate crystals to anhydrous crystals.

While the foregoing process is effective and desirable as compared with the prior art, its commercial application requires a large and expensive plant installation, and once the plant is established, its operation is relatively inflexible. Since the product discharged from the spray drier contains residual crystallizable sugar solution, the spray drier must be operated at a relatively low temperature, which limits drying efficiency. This problem is particularly acute where the crystallizable sugar is dextrose, which is being crystallized in the form of alpha dextrose monohydrate. To avoid the formation of an unstable crystal form of dextrose (viz. beta dextrose), it is desirable to keep the product temperature below about 50° C., and this severely limits the maximum air temperature in the spray drier and the rate of water removal. For example, the maximum permissible air temperature may be as low as 140–150° F. The spray drying unit is thus both expensive to construct and to operate.

It may also be desired to form granules containing a mixture of two or more different sugars, where one sugar may interfere with the crystallization of the other, a mixed solution of both sugars tending to form a solid solution rather than a fully crystalline product. While two separate granular sugar products can be produced and then mixed, this is not a satisfactory answer to the problem, where the desired properties, such as total sweetness, are needed in the individual granules. It is therefore desired to produce a granular product having the desirable properties of SDA granules, while containing a broader range of proportions of crystallizable sugars and of different crystallizable sugars than has heretofore been feasible.

It has been proposed to incorporate modifying agents, such as synthetic sweetening agents, edible organics acids, and food flavoring substances in SDA granules by dispersing the modifying agent or additive in the massecuite before spraying. But the application of this procedure is limited, and it has certain inherent disadvantages. The additive cannot be of a kind or added in each quantity as to interfere with the completion of crystallization of the sugar during and after spraying drying. Another disadvantage is that the additive will contaminate the massecuite mixing, pumping, and spraying apparatus. Consequently, after a product containing a particular additive has been produced, it would be necessary to thoroughly clean all of the apparatus contacted with the additive before resuming production of an unmodified crystalline product, or a product containing a different additive. Such cleaning presents difficulties. Moreover, the shutdown time for cleaning would be objectionable and would increase operating costs in relation to production volume.

SUMMARY

This invention is based in part on the discovery that Massecuite Aggregated Microcrystalline Sugar granules (hereinafter referred to as "MAMS" grandules) can be employed as nuclei for the formation of a granular product, which when completely formed, except for an increase in granule size, is substantially indistinguishable in properties from the original MAMS granules. The MAMS starting material can be Spray-Drier Aggregated (SDA) granules or a recycled product fraction of controlled size. Such granules comprise cohered sugar microcrystals with internal capillary networks which are capable of absorbing substantial quantites of water by capillary action. Thus, when a microcrystalline sugar massecuite is applied to the exterior surfaces of the nuclei granules, water is absorbed into the interior of the granules reducing the water content of the massecuite coatings and causing the microcrystals of the coatings to cohere and unite with their individual nuclei granules. The absorption of water from the coatings into the nuclei granules also promotes formation of sugar microcrystals in the aqueous phase of the massecuite, which is saturated with additional crystallizable sugar when applied, and therefore subject to further crystallization. Such additional crystallization is believed to contribute to the structural coherence of the enlarged granules. This process can be accelerated by using nuclei granules containing anhydrous alpha dextrose microcrystals as a principal component, since such microcrystals can absorb free water and convert it to bound water of crystallization—producing alpha dextrose monohydrate. The consequent reduction of free water in the aqueous phase of the applied massecuite will force further crystallization by producing supersaturation. Still further acceleration of the crystallization process occurs where the crystallizable sugar of the massecuite is dextrose, which withdraws free water as its crystallizes to dextrose hydrate.

Either during or subsequent to the massecuite coating of the MAMS granules, the coated granules can be subjected to further water removal by evaporation and drying. However, drying concomitant with coating may have certain disadvantages, particularly where the sugar in the aqueous phase is to be crystallized into a crystalline form containing water of hydration, such as dextrose monohydrate. In this case, it is preferable to allow sufficient time for the completion of the formation of the dextrose monohydrate crystals. Consequently, a holding or aging step can be utilized advantageously between the coating and drying steps.

The sugar applied as a massecuite to the MAMS granules can be a different sugar than that forming the original granules. For example, a sucrose massecuite can be applied to dextrose granules, such as Total Sugar granules formed from a high D.E. starch hydrolyzate. Where the applied sugar tends to form a small proportion of solid solution with the original sugar of the granules, the solution tends to be drawn into the interior of the granules by capillary action, thus preventing the granular product from being unduly sticky. A similar effect is obtained where the aqueous phase of the massecuite contains a small proportion of non-crystallization sugar, which might otherwise produce a sticky coating on the granules.

Where desired, the applied massecuite can contain modifiers or additives, such as food flavoring agents. The additive or modifier will be present not only in the coated layer, but also internally within the granules, since it will be partially drawn into the granules along with the absorbed water, and thus the distribution of the additive in the granules will be promoted.

It has been found that products can be produced by the process of this invention which for all practical purposes are substantially identical to the original nuclei granules. Where the starting material is SDA granules, the final granular product can be obtained in the form of enlarged but still generally spherical granules composed of cohered sugar microcrystals, and at least the coated layers or "shells" will be highly porous and contain networks of capillary passages. Thus, the coated product can again be subjected to a massecuite coating operation for further granular enlargement. Where the maximum desirable size of the granules is a limitation, the oversize portion of the final product can be subjected to crushing or grinding to produce a recycle material. Crushing of the oversize granular product can produce a material having the desirable absorptive and nuclei forming properties of the intact spherical granules. The crushed granular material will be more irregular in size and shape, but the massecuite coating tends to smooth and round the nuclei as it applies thereto. Thus, after an initial plant start-up using SDA granules, it is feasible to operate entirely on recycled undersize and crushed oversize material.

DRAWINGS

Certain embodiments of the process and products of this invention are illustrated in the accompanying drawings, wherein—

Figure 2:
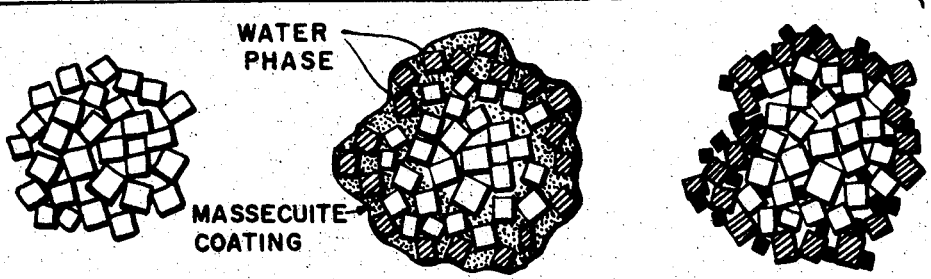

FIG. 1 is a flow sheet illustrating preferred and alternative embodiments of the massecuite coating process of this invention; and FIG. 2 is a diagrammatic illustration of the nuclei or base granule coating shell enlargement and post-crystallization which occurs in the embodiments of FIG. 1.

DETAILED DESCRIPTION

Where the granular starting material has been prepared by the process of the cited co-pending application Ser. No. 674,168, the material will comprise generally spherical granules of crystalline sugar, and the granules will be formed essentially of aggregates of microcrystals of the sugar, such as microcrystals of dextrose monohydrate, microcrystals of sucrose, etc. The average granular size can typically range from about 100 to 400 microns. The size distribution can be further improved by screening of the granular product to remove oversize and undersize material, although exact product sizing is not essential for the purposes of the present process. Thus, the process can be operated satisfactorily entirely with recycled granular material, including undersized granules and crushed oversize material. An SDA granule or recycle feed can range in particle size from minus 200 mesh to plus 20 mesh (American Standard Screens). The bulk of the feed can advantageously be in the range of —20 mesh to plus 100 mesh.

The MAMS starting material will usually contain less than 1% free moisture, and preferably less than 0.5% by weight. While granular products containing free moisture as high as 2 or 3% can be used, such higher moisture contents tend to limit the maximum water which can be applied with the massecuite. It is preferred to utilize a starting material which contains substantially no free water, thereby permitting maximum water absorption up to the point at which the granules begin to soften and their physical structure is disrupted. The total free water content of the enlarged granules should preferably not exceed 5% by weight. The starting material can be made even more water absorptive where it is composed largely of dextrose which is at least partially converted to anhydrous dextrose crystals, since free water will be removed, in converting the dextrose to its hydrate.

As used in the present application, the terms "Spray-Drier Aggregated" or "SDA" mean sugar granules originating from individual spray-dried droplets of a sugar massecuite comprising microcrystals of sugar dispersed in a water solution thereof, additional microcrystals of the sugar having been deposited internally by removal of free water from the residual solution after the spraying of the droplets. In terms of physical structure, the SDA granules comprise cohered sugar microcrystals with internal capillary networks which are capable of absorbing water. The terms "Massecuite Aggregated Microcrystalline Sugar" or "MAMS" granules encompass SDA granules and the granular product of the method of this application.

Massecuites for application to MAMS granules can be prepared in the same manner as the sugar massecuites described in said application Ser. No. 674,168. A water solution of the crystallizable sugar is subjected to partial crystallization to form a flowable or pumpable massecuite composed essentially of microcrystals of the sugar dispersed in a substantially saturated water solution of the sugar. The sugar can be the same or different than the sugar of the MAMS granules to be employed as the base or nuclei granular material. Various additives and edible substances can be incorporated in the massecuite by the simple procedure of mixing it with the massecuite before it is applied to the MAMS granules. This procedure permits a ready incorporation of substances such as synthetic sweetening agents, edible organic acids, and food flavoring substances.

Preferably, the massecuite contains at least 25% of the crystallizable sugar therein in the form of microcrystals, the rest being in the saturated aqueous phase. The upper limit on the proportion of crystalline sugar versus dissolved sugar depends on the handling characteristics of the massecuite, but dextrose or sucrose massecuites containing as high as 40-60% of the crystallizable sugar as the microcrystalline phase can be prepared and utilized.

The present invention can be practiced by a relatively simple procedure. The massecuite is applied, such as by spraying onto a bed of the MAMS granules while the bed is being agitated and intermixed to distribute the applied massecuite therethrough and coat the exteriors of the base granules. From what has been said before, it will be understood that the aqueous phase of the massecuite will have the characteristic of depositing additional sugar microcrystals on the removal of water therefrom, by any of several processes. The water removal begins immediately on application of the coating, since the granules absorb water into the interior which promotes the deposition of additional microcrystals. The spraying or other application is preferably continued until the average size of the granules in the bed is substantially increased. Usually at least 10% up to 25% of total crystallizable sugar (microcrystals and sugar in solution) can be added to the granules in each coating operation, thereby resulting in an appreciable increase in average granule size.

The deposit of additional microcrystalline sugar in the coating around the MAMS nuclei can be promoted by evaporation of water, as well as by absorption of water into the interior of the granules. However, too rapid evaporation of water can result in some of the crystallizable sugar forming a solid solution rather than being deposited as microcrystals. Consequently, the rate of water removal should be controlled until substantially all of the crystallizable sugar has been deposited from the solution in the form of microcrystals. Where the sugar forms a hydrated crystal, as with dextrose in forming dextrose monohydrate, free water can also be eliminated by becoming water of crystallization.

In one preferred embodiment of the present invention, at least the major portion and preferably substantially all of the microcrystalline sugar of the MAMS granules is dextrose. However, in another preferred embodiment, the microcrystalline sugar of the original granules can be composed of a major portion of sucrose or substantially entirely of sucrose. In a particularly advantageous embodiment, the MAMS granules are formed of starch hydrolyzate sugars having a D.E. of at least 94, such as a D.E. of 94-98. The microcrystalline sugar of these granules can be in the form of crystalline alpha dextrose monohydrate, crystalline anhydrous alpha dextrose, or mixtures of the anhydrous and monohydrate crystals. For example, the MAMS granules can be originally produced with the dextrose in the form of monohydrate, and then dried to remove not only any excess free water but at least a portion of the water of crystallization, thereby converting some or all of the monohydrate to the anhydrous crystals. Such dextrose granules containing about 9% water by weight will be substantially dextrose monohydrate, while as the total moisture is reduced, more of the monohydrate will be converted to the anhydrous crystals. Where the total water content of the dextrose granules is less than 5%, the water absorptive capacity of the granules will be greatly increased. If the MAMS dextrose granules contain 15% or more total moisture (hydrate and free moisture) they tend to pack and to lose their free-flowing character. Thus, in embodiments where a dextrose massecuite coating is applied to dextrose granules, it is preferred that the total water content of the granules prior to the application of the coating shall be from 0 to 10% by weight, while on the completion of the coating, the total water content of the enlarged granules is not over 14% (viz. 10-14%).

The process embodiments and products of this invention are further illustrated by the following examples.

Example 1

An enzyme converted starch hydrolyzate having a D.E. in the 95-96% range is decolorized and de-ashed by treatment with activated carbon and ion exchange resins and concentrated to 67-70% solids. It is then cooled to 70-75° F., seeded and gently agitated for several hours until an equilibrium is established between the microcrystals of alpha dextrose hydrate and the suspending saturated solution. Depending upon the concentration, the massecuite temperature is varied from 70° F. to 90° F., to slightly modify the proportion of dextrose in solution, and, hence, control its viscosity. The liquid phase should contain about 50-52% total dextrose solids (crystals and in solution). Approximately half of the dextrose present can be in the form of alpha dextrose monohydrate crystals.

Twenty-four parts of the above massecuite is then added to and thoroughly intermixed with 100 parts of SDA Total Sugar granules (made as described in copending U.S. application Ser. No. 674,168) having a total water content of 9.0% and a D.E. of 95-96. Alternatively, 100 parts of MAMS granules (D.E. 95-96, 9% water) prepared by the process of this application can be used. The resulting mixture which can have a total moisture content of up to 13.0% and have a damp feel and appearance, will be free-flowing enough to be readily agitated, conveyed and further processed.

(a) Half of the mass is spread out and air dried. After 18 hours it will be dry to the touch, and any lumps present will disintegrate on light pressure to give a completely free-flowing material.

(b) The remainder of the mass is retained overnight in a closed container to prevent drying. It will become dry to the touch, and be free-flowing. On subsequent air-drying to 9.0-9.1% moisture, it will remain substantially unchanged in appearance.

During the relatively slow drying process of (a) and in the aging or curing step of (b) further crystallization of the dextrose occurs, and the removal of a portion of the total water by the formation of the alpha dextrose hydrate crystals will result in a dry appearing free-flowing product.

Example 2

The process of Example 1(b) is repeated with 24 parts of the 70% solids massecuite being distributed on and intermixed with 100 parts of the product of Example 1(b). The product is aged and air dried as before. Calculations show that approximately 29% of the total solids content is contributed by the two massecuite additions. Using the same procedure, a third massecuite addition is made to give a product in which about 41% is contributed by the messecuite additions. The final product will have the same aggregated microcrystalline appearance as the original base material and will be equally free-flowing. The average particle size, however, will be slightly larger. Any clumping of the aggregates can be minimized or eliminated by increasing turbulence or degree of agitation during the mixing and/or drying operation.

Example 3

SDA Total Sugar granules or MAMS granules as used in Example 1 are vacuum oven dried to produce an anhydrous material which is essentially unchanged in appearance from the original hydrated material. Sixty-four parts of 68% D.S. massecuite prepared as in Example 1 is then distributed on and thoroughly intermixed with 100 parts of the anhydrous material to give a uniform damp mixture similar to that obtained in Examples 1 and 2. After overnight aging in a closed container, the mixture will asseum a dry free-flowing character similar to that obtained in the previous examples.

The product is then air dried and vacuum dried and a second massecuite addition is made using the proportions above. After aging and air-drying the resulting product will consist of free-flowing aggregates of hydrated dextrose microcrystals similar to the original SDA Total Sugar granules except that they will be somewhat larger. Calculations show that about 30% of the product from the first addition and 51% of the product from the second addition is contributed by the massecuite additions.

This procedure demonstrates that the use of a base of completely or partially dehydrated dextrose SDA granules in place of the hydrated form increases the level of massecuite which can be admixed at one time without forming a resulting mass having flow properties such that it is difficult to handle or further process.

Example 4

Sucrose is dissolved in hot water to form an 80% D.S. solution which is rapidly cooled to 80° F., seeded, and then slowly agitated for several hours to produce a fluid massecuite of sucrose microcrystals suspended in a saturated sugar solution. Fifty-seven parts of the massecuite is then intermixed with 100 parts of (D.E. 95–96, 9% moisture) SDA Total Sugar granules to give a mixture containing 13% total water and in which about 33% of the total solids are contributed by the sucrose massecuite.

(a) A portion is aged overnight in a closed container. It had a damp, non-free-flowing texture, but was not sticky or lumpy and could be readily handled, transported, and further processed.

(b) When the above aged material is air dried it may form occasional cakes or lumps but these will readily break up on slight pressure to give a uniform, free-flowing mass of granules consisting of agglomerates of microcrystals, with the average granule size being slightly larger than those of the original base material.

(c) A portion of the original damp mixture on air drying will give a product similar to that of product (b) above.

This demonstrates that while further crystallization of the sucrose takes place on drying, the crystals formed are not hydrated and, hence, their formation does not tend to lower the free water content of the mixture with a corresponding improvement in the free-flowing properties.

Example 5

The process of Example 2 is repeated except that prior to intermixing with the base sugar, citric acid is dissolved in the massecuite so that each increment of 24 parts of massecuite contain one part of acid. After three massecuite additions, the final product will contain about 1% by weight citric acid, and will be suitable for use as a free-flowing, readily soluble component of a mixture to be added to water to prepare a fruit flavored drink.

Example 6

The process of Example 3 is repeated except that prior to intermixing with the base sugar, finely ground cinnamon is dispersed and suspended in the massecuite in such proportions that each 64 parts of massecuite added will also contain 15 parts cinnamon. The resulting dried product will contain about 5% cinnamon on the surface layer, and will be completely free-flowing and uniform. It can be used as a flavored sugar for baking goods.

Example 7

The process of Example 4 is repeated except that the bed of material to which the massecuite is added will consist of sucrose microcrystalline aggregates, either prepared by the process of said application Ser. No. 674,168, or by the process of this application. The damp mixture is simultaneously crystallized and slowly dried to give a free-flowing, readily soluble product consisting of porous aggregates of sucrose microcrystals.

OPERATIONAL EXAMPLE

While this invention, as illustrated in the foregoing specification and examples, can be practiced in various plant embodiments, and no specific kinds of processing units or apparatus are essential, for sake of completeness of illustration reference will now be made to the flow sheet of FIG. 1, and to certain preferred plant operating conditions.

In plant operations, the massecuite can be prepared from a concentrated water solution of the crystallizable sugar, such as dextrose, sucrose, maltose, fructose, lactose, zylose, etc. In one preferred plant operation, the crystallizable sugar is provided by a high D.E. starch hydrolyzate, such as converted starch having a dextrose equivalent within the range from 94–100 (viz. 95–98). The sugar solution or hydrolyzate is clarified and concentrated to form a syrup, as indicated on FIG. 1 by the legend "High D.E. Refined Syrup from Evaporator," which is passed to the crystallizers 10. The syrup is therein subjected to partial crystallization. A starch hydrolyzate syrup to be crystallized can advantageously contain about 70% Total Sugar solids in solution. The feed to the crystallizer can be introduced at a temperature below 30° C., and maintained at a temperature in the crystallizers of about 20–25° C. Using continuous crystallizers, a crystallization time of as short as eight to ten hours can be sufficient, while with batch crystallization equipment, a crystallization time of up to 18 hours may be desirable. The character of the massecuite can be progressively checked by microscopic examination and by solids determination. While the solids content of the massecuite can vary, a typical end point for the initial crystallization is reached when the massecuite contains about 50% solids (the solids comprising the microcrystals such as microcrystalline alpha dextrose monohydrate).

The resulting massecuite containing the microcrystalline sugar, such as dextrose hydrate in a saturated solution of the sugar (dextrose), is passed to a mixer apparatus 11. The mixer will contain a bed of MAMS granules, which except for start up, are preferably recycled MAMS granules, as indicated in FIG. 1. The mixer can be of various designs, such as rotary mixers, or mixers containing internal paddles, blades or mixing flights. The bed of the nuclei MAMS granules should be free-flowing, and should be continuously agitated and intermixed as the massecuite is applied. Where the massecuite is pumpable, as preferred, it can be sprayed onto the agitated bed.

In FIG. 1, the recycle of MAMS granules through a line 17 to mixer 11 is indicated. For initial start-up, or where recycle MAMS granules are not available, SDA sugar granules can be introduced to the mixer 11, as indicated at 20 by the dotted line. While SDA granules can be used as a part or all of the feed to the bed of mixer 11 in continuous operation, the maximum advantage of the process of the present invention is realized by having bed 11 formed substantially entirely of recycled granules.

Preferably, the temperature of the granular bed in the mixer is kept low enough so that little or no evaporation occurs in the mixer. For starch hydrolyzate or dextrose massecuites, it is preferred to have the microcrystals of the massecuite in the form of alpha dextrose hydrate, and to control the temperature of the massecuite and granular bed in the mixer to keep the dextrose in its alpha crystalline form, and also to promote the formation of additional crystalline dextrose from the saturated solution of the massecuite in the form of alpha dextrose hydrate. For this purpose, the bed and the material in the mixer should be maintained at a temperature below 50° C. For example, the massecuite can be introduced at a temperature of from 20 to 45° C., such as 25 to 40° C., and the bed can be maintained at the ambient room temperature such as 20–25° C.

The MAMS nuclei granules supplied to the mixer 11 can range in size from minus 200 mesh to plus 20 mesh (American Standard sieve). Close size control is not essential, since the final product can be subjected to classification with removal of oversize and undersize material. In general, it may be advantageous for the feed to have an average granule size of about 200 to 300 microns, with most of the particles being plus 200 mesh and minus 20 mesh. For example, using a feed material where most of the particles fall in the range of 225 to 350 microns, the average size being about 250 to 275 microns, on completion of the massecuite coating, most of the particles may have a size ranging from about 250 to 400 microns, with an average size of about 275 to 350 microns. It will be understood, however, that these sizes are merely illustrative, and are not intended to be set out as critical particle sizes.

In practicing the present invention, the application of the massecuite to the bed of nuclei granules is continued until the average size of the granules is substantially increased. The maximum amount of massecuite which can be applied will vary with the particular mixer equipment, type of nuclei granules, and water versus sugar content of the massecuite, as well as other factors. However, the upper limit on massecuite addition is the point at which the granules in the mixer begin to pack or cake, becoming non-free-flowing and unmanageable in the mixing apparatus. In general, such a packing condition can be avoided by maintaining free water content below 5% by weight for the coated granules. For dextrose granules, the total water content (free water plus water of crystallization) is preferably below 14% by weight for the coated granules. For example, if the nuclei granules are composed of alpha dextrose monohydrate, they will contain about 9% by weight water of crystallization, even though there is substantially no free water. In this case, the maximum desirable added water in the aqueous phase of the massecuite will be about 5% based on the total weight of the enlarged, coated granules. With dextrose granules and dextrose massecuites, the maximum feasible amount of massecuite addition can be further increased by converting part or all of the dextrose crystals of the nuclei granules to anhydrous alpha dextrose. Up to 9% more water can therefore be added base on the weight of the original nuclei granules, the water in the aqueous phase of the applied massecuite not only being absorbed by the nuclei granules, but being converted to water crystallization, the anhydrous alpha dextrose crystals being hydrated to form alpha dextrose monohydrate crystals.

After the application of the massecuite is completed and while the coated granules are still in substantially free-flowing condition, they can be passed to a curing chamber 12, where they can be held under essentially nondrying conditions, such as at the ambient room temperature of 20–25° C. In the chamber 12, aging of the granules can occur with the formation of additional sugar crystals from the residual solution of the massecuite. For example, a period of several hours can be allowed for this process to occur. Preferably, the crystalliaztion of the residual solution is allowed to proceed to substantial completion or at least to an equilibrium condition, where no further crystallization will occur without drying. Where the sugar in the residual solution is dextrose and is being crystallized in the hydrate form, as preferred, the crystallization process itself will remove water from the solution, thereby promoting substantially complete crystallization of the dextrose. The post-crystallized enlarged granules can then be passed to a dryer 13 for final drying. The free water content of the granules is preferably reduced to a very low level, such as below 0.5% by weight. If desired, the granules can be further dried to remove all free water and convert part or all of the dextrose crystals to the anhydrous form. Since dextrose granular material passed to dryer 13 can contain the larger portion of the dextrose in the form of already crystallized alpha dextrose monohydrate, the dryer can be operated at temperatures substantially above 50° C. As long as free water is present the dextrose remains as the hydrate. Further drying above 50° C. can convert the hydrate to anhydrous alpha dextrose without formation of beta dextrose. Consequently, dryer 13 can be operated with relatively high product temperatures, such as a temperature within the range of 60 to 90° C., providing the termperature and residence time are not such as to produce discoloration or browning of the sugar granules.

In the embodiment illustrated in the flow sheet of FIG. 1, it is desirable to pass the product from the dryer 13 to a classifer 16 to remove oversize and undersize material. The undersize fraction or "fines" can be passed from the classifier 16 to the recycle line 17 and returned to the mixer 11 to provide a portion of the nuclei granules. The oversize material may be passed to a crushing or grinding mill 18 for comminution. The comminuted "oversize" granules can then be passed to the recycle line 17 to make up another portion of the nuclei MAMS granules in the mixer 11. The bed of nuclei granules can be provided by the recycle of fines and the crushed oversize from the classifer 16, and can be augmented, if desired by MAMS granules from other sources.

The dotted lines on the flow sheet of FIG. 1 illustrate certain alternative operations. The use of SDA sugar granules, such as for initial start up of the plant, has already been referred to, and is indicated in the drawing by the dotted line 20. In certain embodiments, it may be desirable to utilize a combined curing chamber and dryer. As indicated by the dotted line 14, the massecuite coated granules from mixer 11 can be passed to the combination unit 15, which may be a continuous rotary dryer having a relatively cool inlet end with progressively increasing temperature toward the discharge end. This will permit the aging or curing to occur with the formation of additional microcrystals before the final drying of the material, thereby approximating the use of separate curing chamber and dryer, as previously explained.

If it is desired to recycle only fines from the classifier to the mixer, the crushed oversize from mill 18 can be returned by line 19 to the inlet to classifier 16. In this case, most of the recycle can be of fines supplied to the recycle line 17 and returned to the mixer 11. Another alternative not illustrated in the flow sheet is the recycle of a portion of the intermediate size product material from classifier 16. If desired, this intermediate fraction (with or without milling for size reduction) can provide a substantial portion of the recycle to mixer 11, being combined with the recycle fines and/or the combination of the fines and crushed oversize.

Where dryer 13 is operated under conditions producing a dextrose product with negligible free moisture but with the dextrose in the form of the hydrate crystal, approximating a total moisture content of 9% by weight, it may be desirable to further dry the recycle material. For example, the recycle can be passed by the line 21 to a dryer 22, which may be a vacuum dryer, for conversion of part or all of the hydrate crystals to anhydrous crystals, thereby permitting more massecuite to be applied to the nuclei granular material in mixer 11.

For a further understanding of the method of this invention, reference may be made to FIG. 2. This is a somewhat simplified diagrammatic illustration of the stages (shown from left to right) in forming the enlarged granules from the nuclei or base granules. The nuclei or base granule is shown on the left. In the center, the nuclei or base granule is shown coated with the massecuite, containing additional crystals and also a water phase, which is a saturated solution of the crystallizable sugar. As the massecuite is applied to the base granule, the water phase is absorbed into the nuclei, as indicated in the intermediate stage of FIG. 2. This absorption of the water phase into the nuclei tends to unite the microcrystals of the coating and the coating or shell becomes integrated with the nuclei to form the enlarged granule. The absorption of water by the nuclei also tends to promote further crystallization. Where dextrose is being converted to hydrate crystals, this crystal hydration also removes water from the massecuite coating, and induces still further crystallization. Another advantage of the absorptive capacity of the nuclei granule is that any non-crystallizable sugar, such as may be present in a Total Sugar starch hydrolyzate, is drawn toward the interior of the enlarged granule, thereby avoiding having sticky deposits of non-crystallizable sugar on the outer surfaces of the enlarged granule. This phenomena can also be of value where the crystallizable sugar is sucrose and the aqueous phase contains a small percent of non-crystallizable molasses.

In the final stage, residual free water is removed by evaporation, which is preferably forced heat drying. The appearance of the original granule after post-crystallization and drying is shown at the right in FIG. 2. As indicated, the nucleus of the granule will be formed mainly of the original microcrystals, with the microcrystals of the massecuite forming an outer shell or layer around the nucleus. Additional microcrystals from the solution phase of the massecuite will have deposited in the outer shell or layer, and also to some extent within at least the outer portions of the nuclei granule.

While in the foregoing specification this invention has been described in relation to certain preferred embodiments thereof, and many details have been set forth for purpose of illustration rather than limitation, it will be appreciated that the method of this invention is applicable to additional embodiments than those described herein, and that many of the details set forth in the specification can be varied considerably without departing from the basic principles of the invention.

I claim:

1. Process for preparing a granular crystalline sugar product, comprising:
   providing a bed of absorbent, free-flowing Massecuite Aggregated Microcrystalline Sugar nuclei granules,
      said nuclei granules having been aggregated from a massecuite of sugar microcrystals and consisting essentially of cohered sugar microcrystals with internal capillary networks having the characteristic of absorbing water;
   applying a massecuite to said bed while agitating and intermixing said bed to distribute said massecuite and individually coating the exterior surfaces of said nuclei granules, thereby enlarging said granules,
      said massecuite comprising sugar microcrystals in a substantially saturated water solution of sugar, the sugar of said solution having the characteristic of forming additional sugar microcrystals on removal of water therefrom; and
   removing free water from the massecuite coatings of said enlarged granules to integrate said enlarged granules and deposit additional microcrystals therein.

2. The process of claim 1 wherein at least the major portion of the microcrystalline sugar of said nuclei granules is dextrose.

3. The process of claim 1 wherein at least the major portion of the microcrystalline sugar of said nuclei granules is sucrose.

4. The process of claim 1 wherein said nuclei granules are composed essentially of starch hydrolyzate sugar having a D.E. of at least 94, the microcrystalline sugar thereof being selected from alpha dextrose monohydrate, anhydrous alpha dextrose, and mixtures thereof.

5. The process of claim 1 in which the microcrystalline sugar of said nuclei granules and of said massecuite is predominantly alpha dextrose.

6. The process of claim 1 in which the microcrystalline sugar of said nuclei granules is essentially alpha dextrose which is at least partially in its anhydrous form.

7. The process of claim 1 in which the crystallizable sugar of said massecuite is essentially dextrose, the microcrystalline portion of said massecuite being alpha dextrose hydrate, and the temperature of said massecuite and said bed being controlled to cause the dextrose in the solution portion of said massecuite to crystallize as alpha dextrose hydrate.

8. The process of claim 1 in which at the beginning of said massecuite application, said nuclei granules contain not over 5% by weight total water and the microcrystalline sugar thereof is essentially a mixture of alpha dextrose hydrate and anhydrous alpha dextrose, said enlarged granules on the completion of said massecuite application containing not over 14% by weight total water.

9. Process for preparing a Total Sugar product in granular crystalline form, comprising:
   providing a bed of absorbent free-flowing Massecuite Aggregated Microcrystalline Sugar granules,
      said granules having been formed from a microcrystalline massecuite of a starch hydrolyzate having a D.E. of at least 94 and consisting essentially of cohered alpha dextrose microcrystals and oligosaccharides in solid solution,
      said granules providing internal capillary networks having the characteristic of absorbing water,
   applying a massecuite to said bed while agitating and intermixing said bed to distribute said massecuite and individually coat the exterior surfaces of said granules,
      said massecuite having been formed from a starch hydrolyzate of a D.E. of at least 94 and comprising essentially alpha dextrose hydrate microcrystals in a saturated water solution of dextrose,
   continuing said application and said intermixing until the average size of said granules in said bed is substantially increased, and
   removing free water from the coatings formed on said granules while maintaining the temperature of said granules below 50° C. and thereby depositing additional dextrose monohydrate microcrystals in said granules.

10. Process for preparing a dextrose product in granular crystalline form, comprising:
- providing a bed of absorbent, free-flowing Massecuite Aggregated Microcrystalline base granules composed essentially of alpha dextrose microcrystals;
- applying a dextrose massecuite to said bed while agitating and intermixing said bed to distribute said massecuite and individually coat the exterior surfaces of said base granules;
    - said massecuite being composed essentially of alpha dextrose hydrate microcrystals suspended in a saturated dextrose solution;
    - said massecuite and said bed being intermixed at a temperature below 50° C.;
- continuing said application and said intermixing until the average size of said base granules is substantially increased;
- removing free water from the said granules of increased size while maintaining the temperature thereof below 50° C. to convert the dextrose of said solution to microcrystals of alpha dextrose; and
- drying the resulting granular product to further reduce the moisture content thereof.

11. The process of claim 10 in which a portion of the dried granular product is recycled to said bed to provide said base granules.

12. The process of claim 10 in which said dried product is classified to remove an oversize fraction, the granules of said oversize fraction are comminuted to reduce the average size thereof, and the comminuted granules are recycled to said bed to provide a substantial portion of said base granules.

13. The process of claim 12 in which said dried product is also classified to remove an undersize fraction, and said undersize fraction is also recycled to said bed to provide a further portion of said base granules.

14. The process of claim 10 in which at the beginning of said application the granules of said bed contain said alpha dextrose at least partially in its anhydrous crystalline form.

15. The process of claim 14 in which said granular product is divided into a recycle portion and a final product portion, said recycle portion is subjected to further drying to reduce the total water content thereof substantially below 9% by weight to form anhydrous alpha dextrose, and thereafter said recycle portion is passed to said bed to provide a substantial portion of said base granules.

References Cited

UNITED STATES PATENTS

| | | | |
|---|---|---|---|
| 576,861 | 2/1897 | Langen | 127—62 |
| 2,152,874 | 4/1939 | Copland | 127—58 |
| 2,213,710 | 9/1940 | Ludwig | 127—62 |
| 2,728,678 | 12/1955 | Sharp | 99—199 |

MORRIS O. WOLK, Primary Examiner

S. MARANTZ, Assistant Examiner

U.S. Cl. X.R.

127—30, 61, 62, 63

UNITED STATES PATENT OFFICE
CERTIFICATE OF CORRECTION

Patent No. 3,582,399      Dated June 1, 1971

Inventor(s) William C. Black

It is certified that error appears in the above-identified patent and that said Letters Patent are hereby corrected as shown below:

Column 1 -- the assignee reads "Penick & Ford Limited"

Assignee should read -- Penick & Ford, Limited --

Signed and sealed this 21st day of September 1971.

(SEAL)
Attest:

EDWARD M. FLETCHER, JR.         ROBERT GOTTSCHALK
Attesting Officer               Acting Commissioner of Patents